United States Patent [19]

Norton et al.

[11] 4,175,994

[45] Nov. 27, 1979

[54] METHOD OF MANUFACTURING A FLEXIBLE COLLAPSIBLE CONTAINER WITH A STIFFENING MEMBER

[75] Inventors: William W. Norton, Deerfield; Henry Boehmer, Mt. Prospect, both of Ill.

[73] Assignee: Baxter Travenol Laboratories, Inc., Deerfield, Ill.

[21] Appl. No.: 852,422

[22] Filed: Nov. 17, 1977

[51] Int. Cl.[2] .................. B32B 31/18; B32B 31/20; B65D 35/14

[52] U.S. Cl. .................. 156/251; 53/477; 93/8 WA; 150/0.5; 156/268; 156/298; 156/306; 156/515; 156/522

[58] Field of Search .............. 156/251, 309, 298, 263, 156/516, 517, 518, 522, 544, 553, 559, 306, 268, 515; 93/35 DS, 35 H, 8 WA; 150/0.5, 1; 222/107; 128/214 D; 29/413, 417

[56] References Cited

U.S. PATENT DOCUMENTS

| | | | |
|---|---|---|---|
| 2,971,874 | 2/1961 | Canno | 156/517 |
| 3,148,598 | 9/1964 | Davis | 93/8 WA |
| 3,354,795 | 11/1967 | Kugler | 93/8 WA |
| 3,915,212 | 10/1975 | Bujan et al. | 128/214 D |
| 4,025,374 | 5/1977 | Spindler et al. | 156/251 |

*Primary Examiner*—Jerome W. Massie
*Attorney, Agent, or Firm*—Henry W. Collins; Paul Flattery; Garrettson Ellis

[57] ABSTRACT

Method and apparatus for forming novel flexible, collapsible containers from a pair of facing sheet sections, and a stiffener bar positioned between the sheet sections, is disclosed. The pair of facing sheet sections are passed along a process path through a sealing die, with a continuous length of the stiffener bar being positioned between the sheet sections and passed along with process path with the sheet sections. The sealing die forms seal lines between the facing sheet sections to define a group of collapsible containers, each carrying the stiffener bar in transverse relation thereto. Then, at least one of the sheet sections and the stiffener bar is cut through at positions adjacent the edges of the collapsible containers, to permit the separation of the formed collapsible containers, carrying separated stiffener bar sections, from each other.

6 Claims, 5 Drawing Figures

METHOD OF MANUFACTURING A FLEXIBLE COLLAPSIBLE CONTAINER WITH A STIFFENING MEMBER

BACKGROUND OF THE INVENTION

Flexible, collapsible containers made of polyvinyl chloride plastic, polypropylene-based materials, etc. are presently in commercial use, particularly for the dispensing of parenteral solutions, blood, and the like. In many designs of such containers, it is desirable to place a stiffening member in the end of the container, to provide support to promote flat collapse as it is hung on an IV pole or the like for administration of blood, parenteral solution, or any other liquid as desired. The stiffener member facilitates the flat collapse of the container by holding the tail end of the container in a linear configuration, and promotes the accurate reading of volume graduations.

At the present time manual and mechanical methods have been proposed for inserting the stiffener member into the tail end of such containers. Manual methods are relatively high in their labor costs, and the mechanical methods involve expensive machinery, and are subject to mechanical breakdown because of their high complexity of the machinery and the criticality required in the placement of stiffener members into bags.

Furthermore, accomodation must be made for the fact that some collapsible bag materials, such as polyvinyl chloride, tend to shrink during the heat sterilization process. Accordingly, the stiffener member must be properly proportioned so that it fits the width of the sterilized container, and not just the container in its as-made configuration.

This invention provides a simplified method for fabricating collapsible containers with an installed stiffener member. The method is highly automated, and provides essentially flawless commercial production capability for large numbers of such flexible collapsible containers at a significantly reduced manufacturing cost over the cost of the previously suggested methods for installing a stiffener member in a flexible, collapsible container.

DESCRIPTION OF THE INVENTION

In accordance with this invention, flexible collapsible containers are made from a pair of facing sheet sections and a stiffener bar positioned between the sheet sections by passing a pair of the facing sheet sections along a process path through a sealing die with a continuous length of the stiffener bar being positioned between the sheet sections and passed along the process path with the sheet sections. Seal lines are formed between the facing sheet sections with the sealing die to define a group of the collapsible containers, each carrying the stiffener bar in transverse relation thereto. At least one of the sheet sections and the stiffener bar is cut through by pneumatically-operated knife members or similar means, positioned adjacent the edges of the collapsible containers, to permit the separation of the formed collapsible containers, carrying separated stiffener bar sections, from each other.

Thereafter, after cutting of the stiffener bar sections, the groups of containers formed by the sealing dies may be easily separated by any desired manual or automated technique into separate, collapsible containers, each carrying a stiffener bar section.

Preferably, the one sheet section and stiffener bar is cut by the knife member at a position within each side edge of each collapsible container. The cutaway portions of the stiffener bar are then removed, so that each remaining stiffener bar section is of less width than each collapsible container in its as-made configuration. The width of the stiffener bar is made less than the width of the collapsible container, particularly when the container wall material is of the heat shrinkable variety, and the container is intended for subjection to a heating process, for example steam sterilization. In this instance, it is desirable to proportion the length of the stiffener bar so that when the container is subjected to the predetermined heating process such as sterilization, it shrinks to a width which essentially corresponds to the length of the stiffener bar, which preferably runs transversely across the tail end of the container.

It is also further preferable for a further cut to be made from the outside through at least one of the sheet sections to incompletely cut the stiffener bar at positions between adjacent edge cuts of the stiffener bar, at the junctions between adjacent, collapsible containers. This provides flexibility to fold the adjacent containers. At the same time, as the containers are separated, it facilitates the removal of the portions of the stiffener bars which are between the edge cuts, since that portion of the stiffener bar remains an integral piece despite the partial cut.

The sealing die is preferably used to form seal lines in the groups of facing sheet sections on each side of, and adjacent to and parallel to, the stiffener bar sections in the container. This serves to retain and isolate the stiffener bar sections from the remainder of the container.

Also, the sealing die is proportioned to form double seal lines between adjacent containers, as well as a thinned line of tearing weakness positioned between the double seal lines. Accordingly, upon separation of the containers, tearing takes place between the double seal lines along the line of tearing weakness to provide intact containers after separation.

It is also preferred to provide means for severing and removing portions of the stiffener bar between the separate groups of flexible collapsible containers, each group of containers being made by a single impressment of the sealing die.

Accordingly, in this invention, continuous rolls of sheet members are advanced toward the sealing die, along with a continuous roll of stiffening member, which may preferably comprise a generally oval rod of polypropylene plastic. The desired segments of the stiffener rod are then removed after the sealing step with the die member, to provide a reliable means for mass producing containers made of sealed plastic sheets which carry properly proportioned and positioned stiffening members, to facilitate the flat collapse of the draining containers.

Referring to the drawings.

Figure 1:
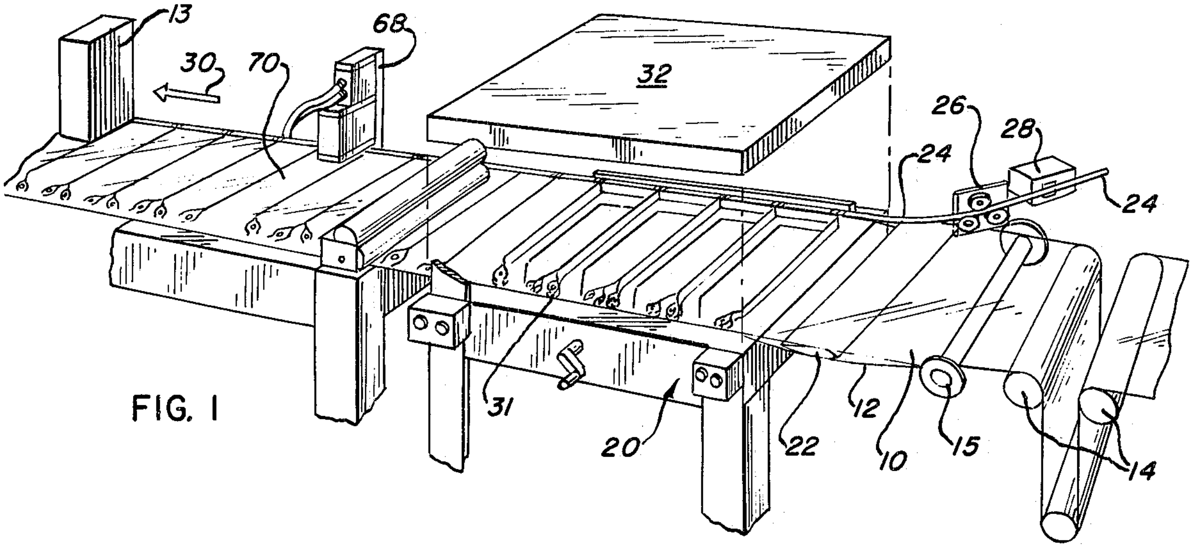
FIG. 1 is a perspective view, with parts removed for clarity, of a typical apparatus for performing the method of this invention.

Referring to the drawings, the apparatus and method are shown for making the containers of this invention. A double layer of facing sheet sections 10, 12 is advanced by a conventional oscillating advance clamp 13, passing through tension controlling dancer rolls 14 and web alignment rolls 15 through guide rollers 18, along a process path, through a sealing die assembly 20, for heat sealing of any desired type of the facing sheet sections into groups of the containers as shown. Preferably, when polyvinyl chloride sheet sections are used, radio frequency sealing is a preferred way for accomplishing the sealing step.

The apparatus used may be largely conventional, for example, a Sealomatic heat sealing machine sold by the Solidyne Corporation of Long Island, New York, modified as shown herein.

Sheet sections 10, 12 may be provided off of rolls of material and advanced into the process path through rollers 14 and 15 by a conventional feed mechanism. It is generally preferred to store both sheet sections 10, 12 prior to processing upon the same storage reel.

The sheet sections 10, 12 are divided by splitter bar 22 as they are advanced, which may be made of polytetrafluoroethylene plastic or the like. Simultaneously, with the advancement of sheet sections 10, 12, stiffener rod 24 is advanced through roller guide member 26 and safety alarm 28 to be positioned between sheet sections 10 and 12. Alarm member 28 is present for the purpose of shutting off the apparatus by conventional means when the stiffener bar 24 is exhausted, so that the process does not continue in the absence of stiffener bar 24.

It is preferable to provide a conventional anchoring die means 25 so that on the first operation of the seaing die, the stiffener member 24 becomes adhered by mashing together with the sheet members 10, 12. Thereafter, sheet members 10, 12 are advanced in direction 30, to expose a fresh section of sheet members 10, 12 to the sealing die 20. This advancement causes the corresponding advancement of stiffener rod 24. Thereafter, the rollers halt their motion, and platen 32 of die 20 is dropped against the sheet sections to provide radio frequency sealing, or any other sealing technique as desired, of the sheet sections 10, 12 along container-defining seal lines 34, 36, etc., as shown particularly in FIG. 2.

Top seal 39 of the container is also provided, being made thin enough to permit tearing away of outer strip 41.

Other auxiliary seal lines are provided as desired, the specific shape shown herein being that of the VIAFLEX® parenteral solution container, sold by Travenol Laboratories, Inc. of Deerfield, Illinois. Specifically, a tail seal section 38 is provided including a generally oblong line of tearing weakness 40 to permit the punching through of the tail section 38 for hanging of the container upon an IV pole or the like. Other tear lines such as lines 42 are also impressed in sheets 10, 12 by die 20, as well as annular lines of weakness 44 to provide punch-out portions at the upper end of the container in the manner of the commercially available VIAFLEX® container. The various tear lines and sealing lines are formed in the sheet sections 10 and 12 in any conventional manner of the sealing of plastic materials with a sealing die, using elevated seal line forming ridges and the like for pressing against raisable and lowerable platen 32.

The various seal-forming ridges of die 20 are defined by die inserts 42, which may be attached to the base 45 of sealing die 20.

Heat or radio frequency energy is transmitted as desired, such as by lines 47, to the raised portions under seal lines 34, 36, 44, etc. of the sealing die 20 or platen 32 by a connected generator.

Figure 2:
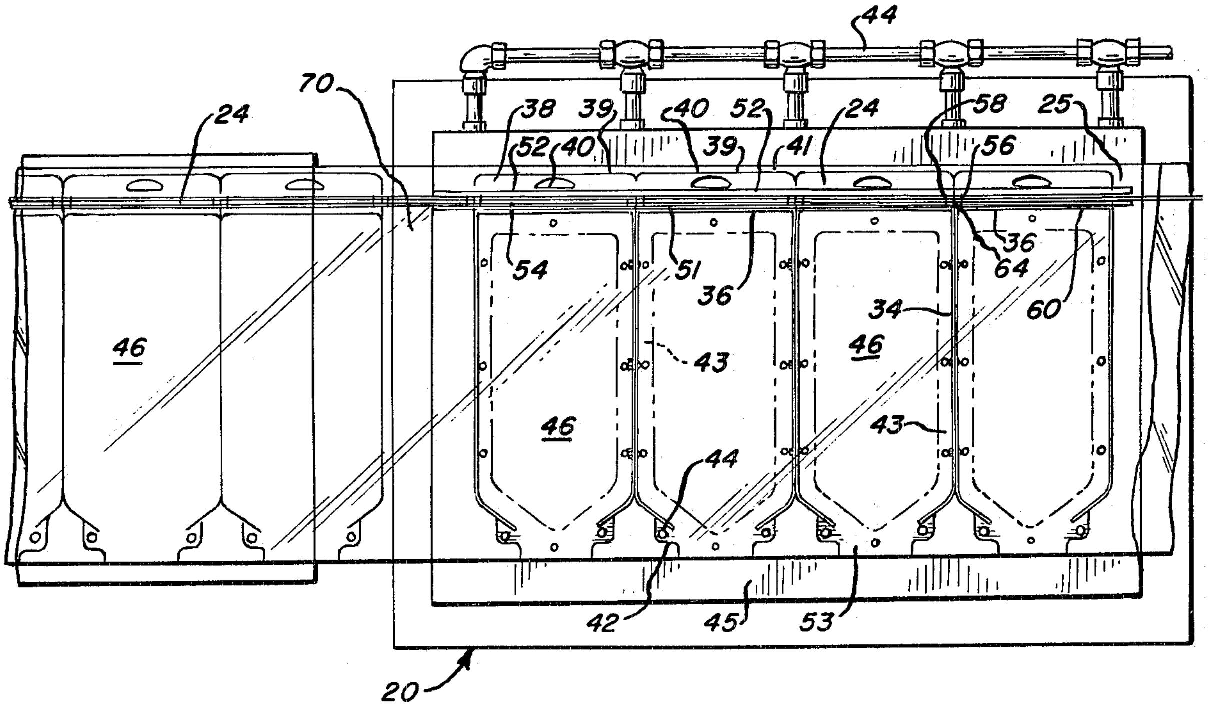
FIG. 2 is a plan view of the sealing die and other portions of the apparatus of FIG. 1, with upper parts of the structure removed for clarity.
Figure 4:
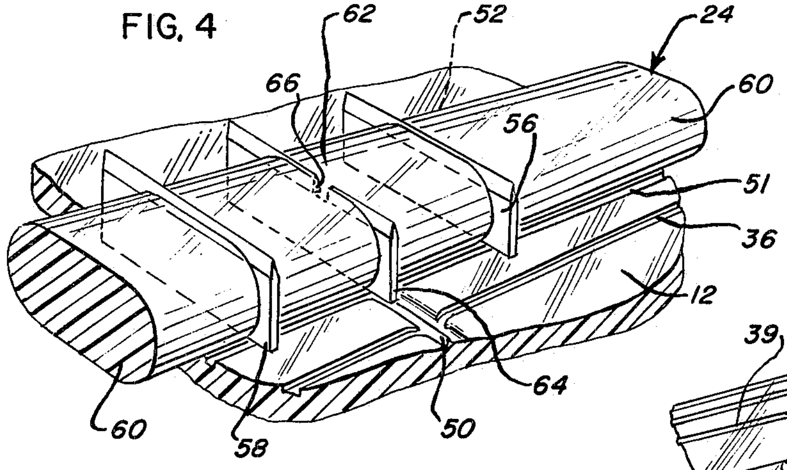
FIG. 4 is a further enlarged perspective view showing the pneumatically operated knife members positioned in the die member which are used to make the cuts as illustrated in FIG. 3.

As is seen in FIG. 2, groups of separate containers 46 are defined in sheet sections 10, 12 by sealing die 20.

Figure 3:
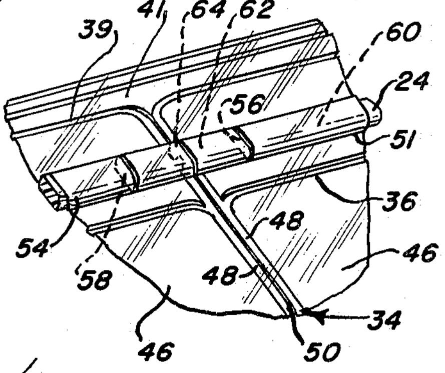
FIG. 3 is a greatly enlarged perspective view of a portion of the facing sheet sections and stiffener bar as sealed by the die member, showing positions of the cutting of the stiffener bar in at least one sheet section.

The lateral seal lines 34 are typically, as shown in FIG. 3, made of a pair of heat seal lines 48, one for each adjacent container, separated by a thinned. line of tearing weakness 50 to permit separation of the containers 46 after processing. Line of weakness 50 merges with a line of weakness in tearable top seal line 39.

Rear seal line 51 is positioned parallel to and adjacent to stiffener bar 24. Another seal line 52 is positioned in parallel relation to stiffener bar 24 on the other side from seal line 36, to retain and isolate the stiffener bar sections which are formed from stiffener bar 24.

Open mouths 53 are defined in the individual containers 46 for later sealing.

Alternatively, the sealing die utilized herein may be used in conjunction with a plastic sealing machine made by Kabar Manufacturing Corporation of Farmingdale, New York, with the platen 32 and its supporting structure (not shown) and other ancillary parts of the apparatus being of conventional design.

Stiffener bar 24 is guided and held in stiffener bar channel 54 in the sealing die defined between the elevated portions which form the seal lines 51, 52.

Positioned within channel 54 are several groups of knives, mounted within die bed 45 and actuated by air cylinders to punch upwardly to penetrate the lower facing sheet section 12 and to cut stiffener bar 24. Also, if desired, the knives can cut upper facing sheet section 10.

Each group of knives is shown to comprise a pair of knives 56, 58 which are adapted to be raised by the air cylinder for cutting at a position within each edge of seal 34 of each collapsible container 46, to pass through sheet section 12 and completely sever stiffener bar 24 into a series of stiffener bar sections 60, plus a group of stiffener bar portions 62 which will be later removed from the separated containers.

Also, a central knife member 64 is provided to operate in conjunction with knife members 56, 58 to cut stiffener bar 24 at positions which are on lines of tearing weakness 50. However, this cut is incomplete because of the presence of recess 66 in the cutting edge of knife member 64, so that portion 62 of the stiffener bar 24 remains intact although practically cut through. This in turn facilitates the removal of the entire portion 62 of the stiffener bar upon tearing of lines 50 to separate the separate containers. A piece of portion 62 protrudes after such separation, and can be easily manually removed.

Air cylinder actuated knives 56, 58 and 64 are actuated in any conventional manner of processing machine technology to operate in a manner which correlates with the remainder of the machine operations, cutting through stiffener bar 24 to provide the shorter, stiffener bar sections 60 for each individual container, typically while sheet sections 10, 12 are stationary and during or just after the heat sealing step for forming the various seal lines between the two sheet sections.

After these processes are complete, sheet sections 10, 12 are advanced once again to cause the newly-formed containers 46 to be advanced out of the sealing die, and a new portion of the sheet sections 10, 12 to be presented to the sealing die for further processing. At the same time stiffener bar 24 is advanced along with the sheet sections at the point 25 where the anchor die 25 acted, to the rear of the cut stiffener bar.

Pneumatically-operated punch-out member 68 is provided to punch out the portion of stiffener bar at the area 70 between separate groups of containers, each group of containers being formed by a separate sealing operation of the sealing die 20. This also facilitates the folding of the groups of containers.

Knives 56, 58 are typically positioned about 5/16 of an inch away from line of tearing weakness 50, so that each stiffener bar section 60 being cut out on both ends, is about $\frac{5}{8}$ inch shorter than the width of the container in its as-made configuration. When polyvinylchloride containers are being manufactured, autoclaving of the containers after filling with solution can cause them to shrink down to substantially a width which corresponds to the length of each stiffener bar section 60. Also, the shortening of the stiffener bar prevents it from projecting outwardly beyond the width of the container, which can damage an overpouch for the container if that is used, or other packaging.

Figure 5:
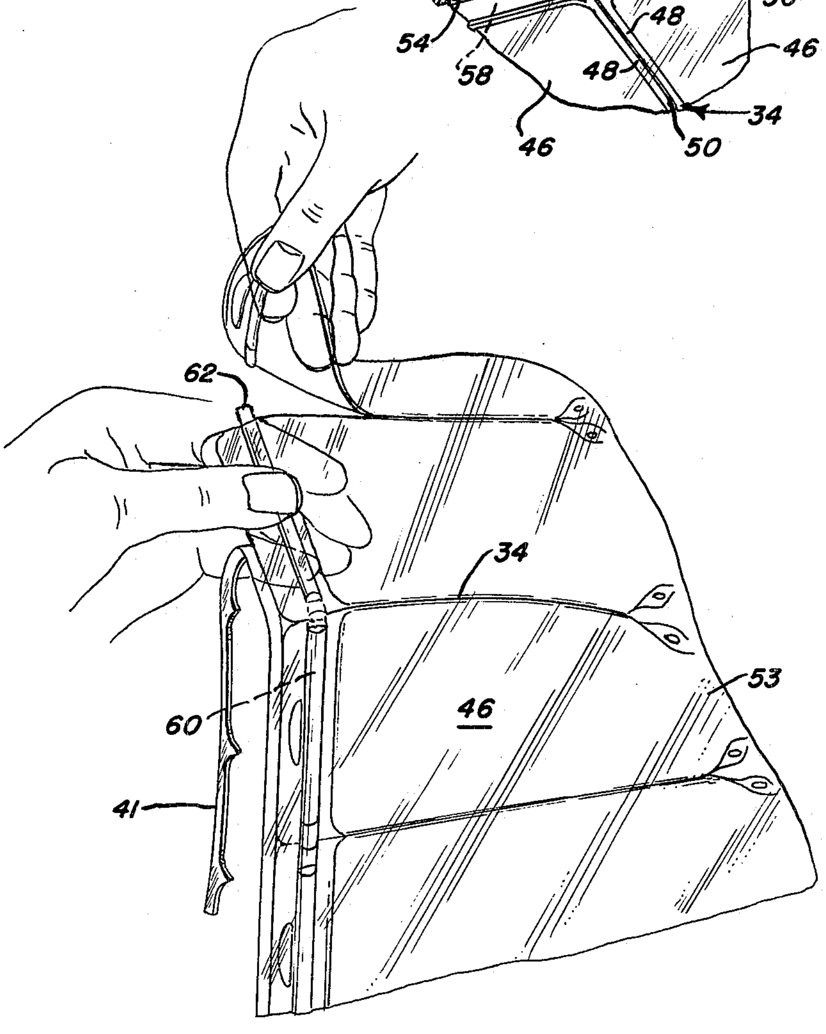
FIG. 5 shows a completed group of the containers of this invention in the process of having the cut portions of the stiffener bar manually removed after performance of the process of this invention, to provide the flexible, collapsible containers having properly proportioned stiffening bars as described above.

The channel 54 between seal lines 51, 52 may be proportioned to flare outwardly at the edges of each container as shown, from a typical width of about $\frac{1}{4}$ inch at the central portion of the channel 54 to a width of about 5/16 inch on each side of the container, to facilitate the removal of portions 62 of stiffener bar 24 during the separation of the containers. This container separation after manufacture in accordance with this invention is illustrated in process in FIG. 5.

The above has been offered for illustrative purposes only and is not to be construed as limiting the scope of the invention, which is as defined in the claims below.

That which is claimed is:

1. The method of forming flexible, collapsible containers from a pair of facing sheet sections and a stiffener bar positioned between said sheet sections, which comprises:

passing said pair of facing sheet sections along a process path through a sealing die, with a continuous length of said stiffener bar being positioned between said sheet sections and passed along said process path with said sheet sections; forming seal lines with said sealing die between said facing sheet sections to define a group of said collapsible containers, each carrying said stiffener bar in transverse relation thereto; cutting through at least one of said sheet sections and incompletely cutting said stiffener bar at positions adjacent the edges of said collapsible containers; cutting said one sheet section and stiffener bar at a position within each edge of each collapsible container; and removing the cut-away edge portions of said stiffener bar, to facilitate the separation of the formed, collapsible containers, carrying separated stiffener bar sections, from each other whereby each remaining stiffener bar section is of less width than each collapsible container in its as-made configuration.

2. The method of claim 1 in which said facing sheet sections are made of polyvinylchloride plastic.

3. The method of claim 2 in which the forward end of said stiffener bar is initially bonded to said facing sheet sections, to be advanced along said process path by being pulled by said sheet sections.

4. The method of claim 5 in which seal lines are formed in said facing sheet sections on each side of, adjacent to, and parallel to said stiffener bar sections in the container, to retain and isolate said stiffener bar sections.

5. The method of claim 4 in which the seal lines formed between groups of adjacent containers are double seal lines with a line of tearing weakness positioned between them.

6. The method of claim 1 in which said facing sheet sections are made of a plastic material that shrinks upon exposure to heat, said stiffener bar sections being proportioned to be essentially equal to the width of said container after a predetermined heat treatment.

* * * * *